Nov. 20, 1928.
W. V. VAN ETTEN
1,692,101
DIRIGIBLE SPOTLIGHT MOUNTING
Filed Nov. 3, 1925
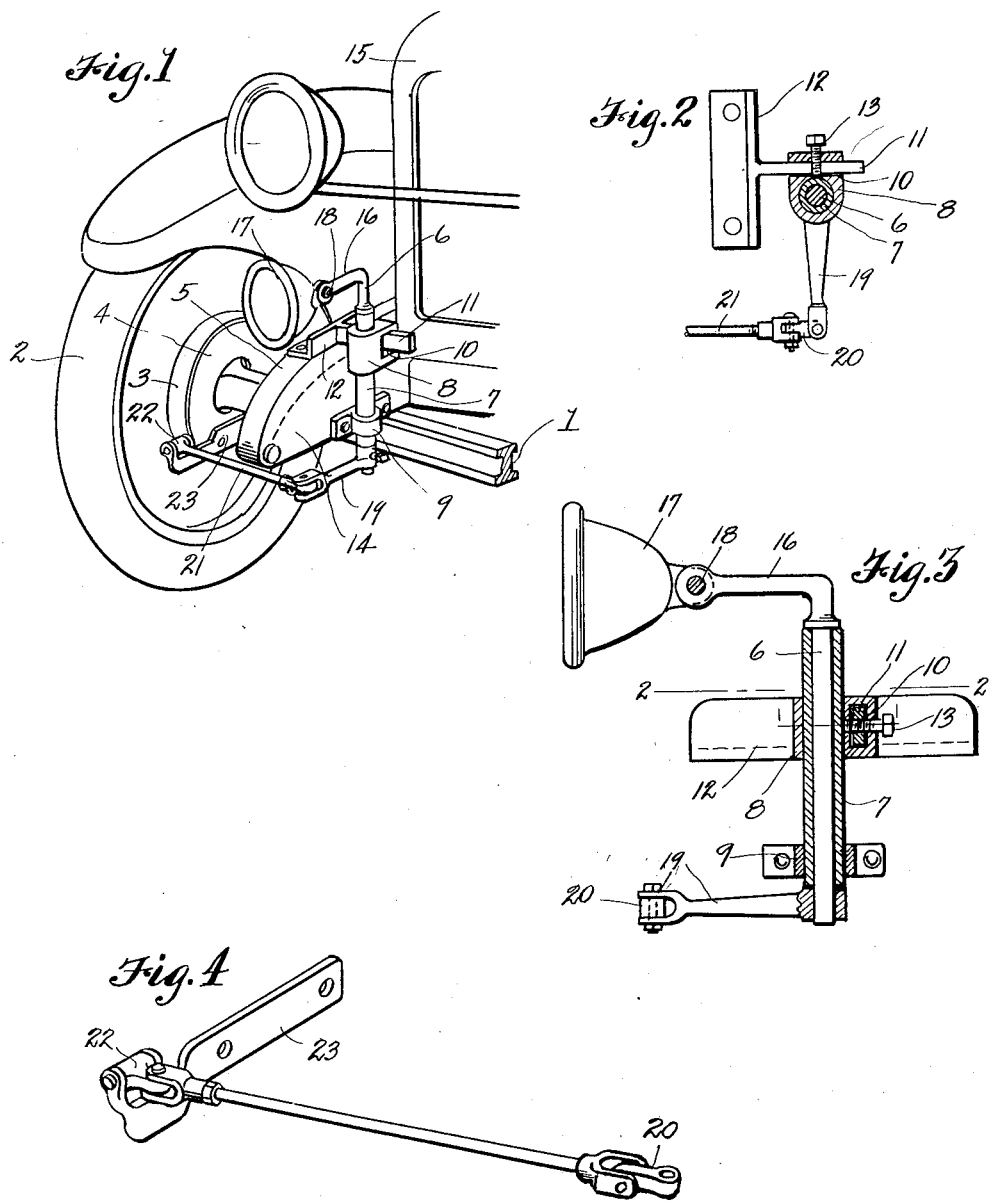
INVENTOR
WILLIAM V. VAN ETTEN
BY
Richard J. Cook
ATTORNEY Patented Nov. 20, 1928.

1,692,101

UNITED STATES PATENT OFFICE.

WILLIAM V. VAN ETTEN, OF EVERETT, WASHINGTON.

DIRIGIBLE-SPOTLIGHT MOUNTING.

Application filed November 3, 1925. Serial No. 66,484.

This invention relates to improvements in dirigible spotlights and more particularly to a supporting bracket and steering mechanism for dirigible headlights used on vehicles having front wheels brakes; it being the principal object of this invention to provide a bracket that may be attached to the vehicle frame to support a spotlight forwardwardly of the front axle and adjacent the inside of one of the front wheels, with a steering mechanism therefor that may be fixed to the cover plate of one of the front wheel brakes.

Other objects of the invention reside in the details of construction and combination of parts as will hereinafter be described whereby the spotlight is actuated to direct the light according to the direction of movement of the vehicle.

In accomplishing these and other objects of the invention, I have provided the improved details of construction, the preferred forms of which are illustrated in the accompanying drawings, wherein—

Figure 1 is a perspective view illustrating a dirigible spotlight embodied by the present invention as actuated through a connection attached to the cover plate of the front wheel brake drum.

Figure 2 is a horizontal section taken substantially on line 2—2 in Figure 3.

Figure 3 is a side elevation and sectional view of the light supporting brackets.

Figure 4 is a perspective view of the lamp steering mechanism.

Referring more in detail to the drawings—

1 designates the front axle of an automobile, 2 a steering, or ground wheel, mounted thereon and equipped with a brake drum 3 having a non-rotatable cover plate 4 and 5 designates the forward end portion of one of the longitudinal side beams of the chassis.

The present device comprises the spotlight mounting shaft 6 which is revolubly contained within a sleeve 7 that is mounted in vertically alined bearings 8 and 9. The bearing 8 is provided with an opening 10 therethrough whereby it is mounted on a lateral arm 11 that extends horizontally from an angle plate 12 that is fixed to the top of beam 5. A set screw 13 is threaded through the bearing and arm and bears against the sleeve 7 to retain it in proper position. The bearing 9 is fixed to the lower edge of the apron 14 that is fixed to the inside of beam 5 forwardly of the radiator 15.

At the upper end of shaft 6 is a forwardly turned arm 16 to which a spotlight 17 is pivotally fixed by a bolt 18 and fixed to the lower end of the shaft is a forwardly directed arm 19 which is connected at its end by means of a toggle 20 with one end of a link 21 which, at its other end is connected by a toggle 22 with a bar 23 that is bolted or otherwise fixed to and extends forwardly of the drum cover plate 4. The connections are such that, movement of the steering wheel to direct the vehicle toward one side or the other likewise causes rotative movement of shaft 6 to change the direction of the spotlight accordingly.

It is to be understood that the bar 23 could, if necessary, be attached to the steering knuckle or other part if it is not convenient or desirable to attach it to the drum cover. It is apparent also that various adjustments can be made so as to fit vehicles of various design.

Having thus described my invention, what I claim as new therein and desire to secure by Letters-Patent, is:

In a vehicle of the class described, the combination with the frame parts of a vehicle and a cover plate for a brake drum of one of the steering wheels of the vehicle, of a pair of vertically alined bearings secured to the frame parts; the upper of said bearings being horizontally adjustable on its support, a sleeve vertically adjustable in said bearings, means for retaining the sleeve at different positions of adjustment, a spotlight mounting shaft rotatable in said sleeve, a spotlight mounted on the upper end of the shaft, a forwardly directed arm fixed to the lower end of the shaft, a bar fixed to the drum cover plate and a connecting link having toggle connections at its ends with the bar and with the arm to cause the spotlight to be directed in accordance with the direction of movement of the vehicle.

Signed at Seattle, King County, Washington, this 30th day of September, 1925.

WILLIAM V. VAN ETTEN.